Jan. 5, 1965   E. W. CONRAD   3,164,222
NON-REUSABLE KINETIC ENERGY ABSORBER
Filed Jan. 4, 1963   2 Sheets-Sheet 1

*INVENTOR*
EARL W. CONRAD

BY *[signature]*
*[signature]* Gene E. Shook ATTORNEYS

Jan. 5, 1965  E. W. CONRAD  3,164,222
NON-REUSABLE KINETIC ENERGY ABSORBER
Filed Jan. 4, 1963  2 Sheets-Sheet 2

*INVENTOR*
EARL W. CONRAD

BY
*Gene E. Shook* ATTORNEYS

United States Patent Office 3,164,222
Patented Jan. 5, 1965

3,164,222
NON-REUSABLE KINETIC ENERGY ABSORBER
Earl W. Conrad, Berea, Ohio, assignor to the United States of America as represented by the Administrator of the National Aeronautics and Space Administration
Filed Jan. 4, 1963, Ser. No. 249,540
10 Claims. (Cl. 188—1)
(Granted under Title 35, U.S. Code (1952), sec. 266)

The invention described herein may be manufactured and used by or for the Government of the United States of America for governmental purposes without the payment of any royalties thereon or therefor.

This invention relates to energy absorbing or shock absorbing devices, and more particularly to an expendable energy absorber. The invention is especially concerned with an energy absorbing device for the soft landing of space vehicles.

Various devices have been proposed for dissipating the kinetic energy of such a falling mass to provide a landing that is within the required limitations of deceleration and deceleration-onset rates. These devices utilize one or a combination of several of the following energy absorbing phenomenon: gas compression, as in gas bags; fluid or other mass acceleration, as where contoured surfaces are used for water landings; friction, as in drag line brakes or in drag chutes; chemical energy, as in retrorockets; and material or structural deformation or extrusion. From the standpoint of weight requirements, devices utilizing the last named energy absorbing means are preferred, but such devices have the disadvantage of creating a spray of metal shrapnel which may damage adjacent propellant tanks or other structures.

This problem is solved by the non-reusable kinetic energy absorber of the present invention which is formed by the simultaneous wrapping of overlapping sheets with the tension on the concentrically wound sheets carefully controlled to obtain the desired force-stroke characteristics on impact. The kinetic energy of the falling mass is absorbed by friction between sliding contacting surfaces and converted to heat energy. A light weight structure is obtained because extremely thin sheets of material can be used due to the mutual support in column loading afforded by the several layers which are in contact over an appreciable length.

It is, therefore, an object of the present invention to provide an improved shock absorber for use in energy dissipation systems for lunar touchdowns.

Another object of the invention is to provide an expendable shock absorbing or energy absorbing device which has exceptionally high kinetic energy absorption ability per unit weight of the device.

Still another object of the invention is to provide a non-reusable kinetic energy absorbing device in which the force-stroke characteristics may be tailored to meet the specific landing conditions.

Other advantages of the invention will be apparent from the specification which follows and from the drawings wherein like numbers have been used throughout to identify like parts.

Figure 1:
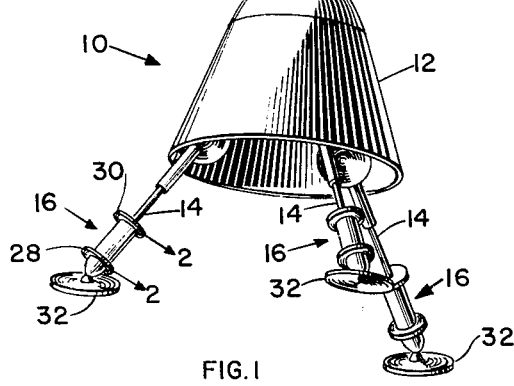
FIG. 1 is a perspective view of a space vehicle having mounted thereon non-reusable kinetic energy absorbers constructed in accordance with the present invention.
Figure 2:
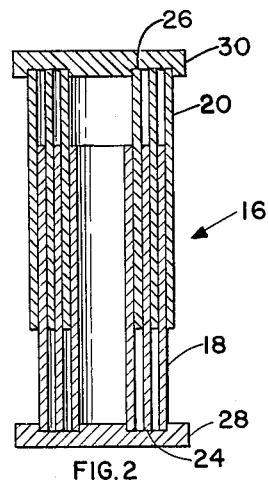
FIG. 2 is an enlarged sectional view taken along the line 2—2 in FIG. 1.

Referring now to the drawings, there is shown in FIG. 1 a space vehicle 10 for making a soft landing by dropping on a relatively firm area, such as the surface of the moon. The vehicle 10 has a cargo enclosure 12 with a plurality of legs 14 extending outwardly therefrom. Each leg 14 mounts a non-reusable kinetic enery absorber 16 constructed in accordance with the invention.

Figure 7:
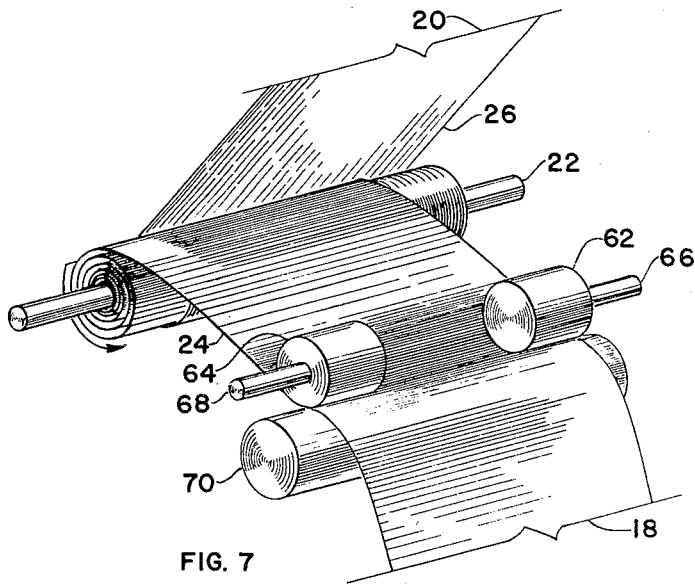
FIG. 7 is a schematic view illustrating a method of making the non-reusable kinetic energy absorbers of the present invention.

According to the present invention, each kinetic energy absorber 16 comprises a pair of thin sheets 18 and 20 that are concentrically wound on a mandrel 22 under controlled tension as shown in FIG. 7. These sheets are initially displaced axially relative to each other so that each sheet has an outwardly directed edge 24 or 26 remote from the other sheet. Suitable end caps 28 and 30 engage the edges 24 and 26 respectively and distribute the column loading equally. The end cap 30 is secured to the leg 14 while the opposed end cap 28 swivelly mounts a pad 32 which engages the relatively firm surface upon which the vehicle 10 drops.

An important feature of this structure is that a very large surface area of contact between the sheets 18 and 20 can be obtained. Also, these sheets can be very thin because after they are wound, they are placed in column loading by the end caps and are mutually supporting to resist buckling. Because the sheets 18 and 20 engage one another in sliding friction, very high energy absorption per pound of weight of each absorber 16 is obtained.

Figure 3:
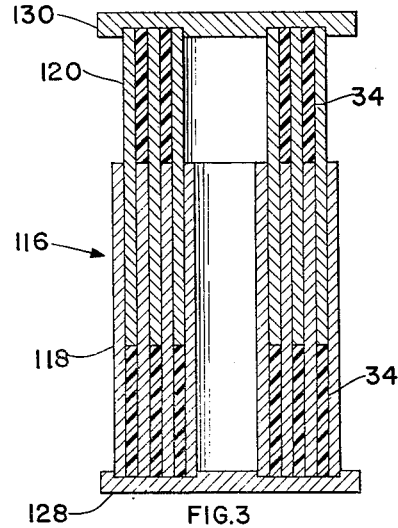
FIG. 3 is a vertical sectional view of an energy absorber illustrating a modification of the device shown in FIG. 2.

Referring now to FIG. 3 there is shown a kinetic energy absorber 116 which is similar to the device 16 and has been modified to absorb very large values of kinetic energy per unit weight. In this embodiment all portions of the individual sections or strips of helical sheet material 118 and 120 must be prevented from buckling or deforming when the device is used in compression. This may be accomplished by interposing a layer of very light but rigid filler material 34 in the spaces between the successive layers of each sheet bounded at one end by the portions of the sheets that are in engagement and at the other end by end caps 128 and 130. This material may be a plastic foam that is poured or injected into the voids formed in the assembly prior to the attachment of the end caps. The primary function of the filler 34 is the stabilization of the absorber 116 in column loading.

It is contemplated that numerous configurations of the sheet may be used to tailor the force vs. stroke characteristics of the energy absorbing device to any desired value. For example, a progressive curve of force vs. distance is achieved by tapering the width of a sheet 220 of a kinetic energy absorber 216 shown in FIG. 4 prior to wrapping it with a constant width sheet 218 in the manner shown in FIG. 7. In this embodiment the distance between the inner edge of the sheet 220 adjacent the sheet 218 and the outer edge 224 varies from a maximum at the innermost wrap to a minimum at the outermost wrap. The force vs. stroke characteristics may be altered still further by tapering the width of the sheet 218 prior to its wrapping and assembly with end caps 228 and 230. A layer of filler material 234 is interposed between successive wraps of the tapered sheet 220 as well as the sheet 218 to stabilize the absorber 216 in column loading.

Figure 4:
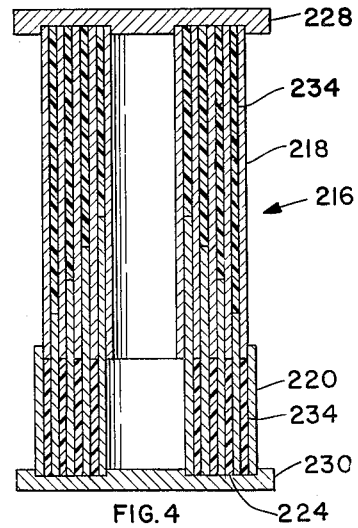
FIG. 4 is a vertical sectional view of an alternate embodiment of a kinetic energy absorber constructed in accordance with the invention.
Figure 6:
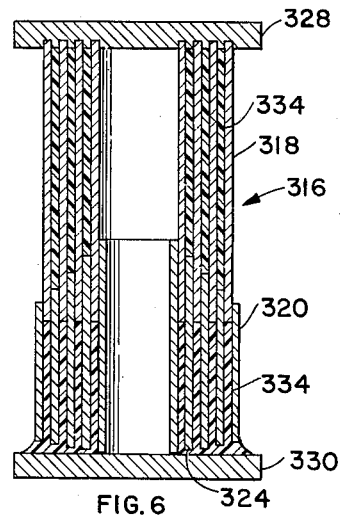
FIG. 6 is a vertical sectional view of an energy absorber illustrating a modification of the device as shown in FIG. 4.

Because of the change from static to dynamic friction, some overshoot in force may occur at the beginning or end of the stroke in certain cases, and this problem is solved by the kinetic energy absorber 316 shown in FIG. 6 which is a modification of the embodiment illustrated in FIG. 4. This modification is made at the end attachment where the tapered sheet 320 meets the end cap 330, and as shown in FIG. 6 the sheet 320 has a taper along the outer edge 324 as well as the inner edge so that only the central portion of the edge 324 engages the end cap 330 in the normal position prior to impact. In the embodiment shown in FIG. 6 the outer edge 324 progressively engages the end cap 330 as the end cap 328 moves toward the end cap 330; thus, any sudden brake-away will be avoided because the helically wound tapered edge of the wrap will make contact with the advancing end cap in a continuous progressive manner.

Figure 5:
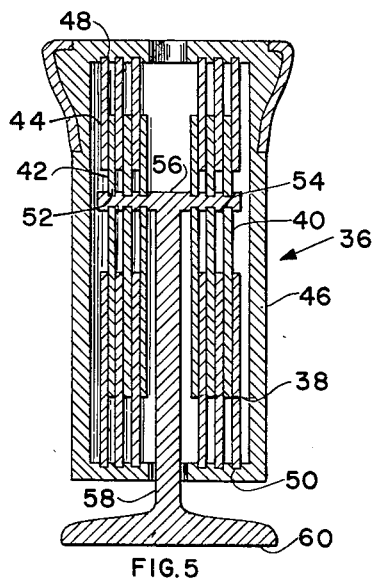
FIG. 5 is a vertical sectional view of still another alternate embodiment of the present invention.

Still another force vs. stroke curve is obtained by using the kinetic energy absorber 36 shown in FIG. 5. A pair of sheets 38 and 40 which have been concentrically wrapped in the manner illustrated in FIG. 7 are used in conjunction with sheets 42 and 44 that are similarly wrapped and axially aligned. All of these sheets are enclosed in a housing 46 with the outer edges 48 of the sheet 44 in contact with the inner surface of the upper portion of the housing which is secured to one of the legs 14 on the vehicle 10 while the outer edge 50 of the sheet 38 engages the inner surface of the lower portion of the housing 46. The outer edge 52 of the sheet 42 which mates with sheet 44 engages the upper surface of a flange 56 on the upper end of an elongated member 58 that is mounted for reciprocation in the housing 46 while the outer edge 54 of the sheet 40 which mates with the sheet 38 engages the lower surface of this flange. The member 58 protrudes outwardly through a suitable aperture in the bottom of the housing 46 and carries a plate 60 that swively mounts one of the pads 32. As the housing 46 moves towards the plate 60 the sheets 42 and 44 will slide along each other with the mating portions in frictional contact progressively increasing in area. Likewise, the mating portions of the sheets 38 and 40 in frictional contact will progressively decrease in area.

Another manner of achieving a desired shape of the curve for the force vs. stroke characteristics is by maintaining different tensions on the opposed edges of the sheet 18 during the wrapping process illustrated in FIG. 7. This is accomplished by utilizing a pair of brake wheels 62 and 64 mounted on axles 66 and 68 respectively. The brake wheels 62 and 64 force the sheet 18 against a back up roll 70 as the sheet is fed from a supply roll (not shown). For example, a very high drag may be placed on one edge of the sheet 18 by the brake wheel 62 while low drag may be placed along the opposite edge by the brake wheel 64. If desired, similar brake wheels may be used in combination with a back up roll to vary the tension across the sheet 20.

While several embodiments of the invention have been illustrated and described, various modifications may be made to the disclosed structure without departing from the spirit of the invention of the scope of the subjoined claims. For example, it is contemplated that hundreds of layers of aluminum foil on the order of 0.004 inch thick may be utilized instead of the concentrically wound sheets 18 and 20.

What is claimed is:

1. A non-reusable kinetic energy absorbing device comprising
    a first rigid member, and
    a second rigid member having non-resilient portions in sliding frictional contact with portions of said first rigid member to accommodate longitudinal displacement of said rigid members relative to one another whereby the areas of said portions in sliding frictional contact progressively change during said displacement,
    said portions of said first and second rigid members in sliding frictional engagement with one another being generally parallel to the direction of said longitudinal displacement for preventing deformation of the said first and second rigid members.

2. A non-reusable kinetic energy absorbing device comprising
    a member having a first surface, and
    another member having a second surface substantially parallel to said first surface and in non-resilient sliding frictional engagement therewith to accommodate telescoping displacement of said members wherein said members slide from an extended position having minimum areas of said surfaces in frictional engagement with one another to a contracted position having maximum areas of said surfaces in frictional engagement with one another,
    Both said first and second surfaces being generally parallel to the direction of said telescoping displacement for column loading of said members.

3. An energy absorbing device comprising
    a pair of helically curved sheets concentrically wrapped about one another with portions of the surfaces of each sheet being in frictional engagement with mating portions of the surface of the other sheet whereby said portions of the sheets are mutually supported in column loading to prevent deformation,
    said sheets being initially displaced axially relative to each other whereby each sheet has an outwardly directed edge remote from the other sheet, and
    a member in engagement with each of said edges for distributing the column loading equally to all portions of said sheets.

4. An energy absorbing device as claimed in claim 3, including a layer of substantially rigid material interposed between said sheets intermediate said remote edges and said mating portions to increase the mutual support thereof in column loading.

5. An energy absorbing device as claimed in claim 3, wherein one of said sheets has a tapered width.

6. An energy absorbing device as in claim 3, including another pair of helically curved sheets concentrically wrapped about one another, and
    means for mounting said pairs of sheets so that the mating portions of one pair in frictional engagement increases as the column loading is applied while the mating portions of the other pair in frictional engagement decreases.

7. An energy absorbing device comprising
    a first helically curved member,
    a second helically curved member contiguous with said first member,
    said members being concentrically wrapped about one another whereby surfaces on said first member frictionally engage mating surfaces on said second member, and
    said first member being axially displaced relative to said second member to reduce the areas of said surfaces in frictional engagement with one another, said areas progressively increasing as said first member is axially moved toward said second member.

8. An energy absorbing device as claimed in claim 7 wherein said first member has circumferential tension which varies along the axis of the device, and
    said second member has a circumferential tension which varies along the axis of the device.

9. An energy absorbing device as claimed in claim 7, including an end cap in engagement with a portion of an outwardly directed edge on said first member.

10. An energy absorbing device as claimed in claim 7 wherein each of said members comprises a plurality of thin sheets having a thickness of about 0.004 inch.

References Cited in the file of this patent

UNITED STATES PATENTS

| | | |
|---|---|---|
| 1,713,515 | Bechereau | May 21, 1929 |
| 2,961,204 | Rayfield et al. | Nov. 22, 1960 |
| 3,059,916 | Fahlbusch et al. | Oct. 23, 1962 |